(12) United States Patent
Li et al.

(10) Patent No.: US 9,096,281 B1
(45) Date of Patent: Aug. 4, 2015

(54) DUAL MODE MOBILE ROBOT

(71) Applicant: ENGINEERING SERVICES INC., Toronto (CA)

(72) Inventors: Yi Li, Richmond Hill (CA); Andrew A. Goldenberg, Toronto (CA)

(73) Assignee: ENGINEERING SERVICES INC., Toronto, ON (CA)

( * ) Notice: Subject to any disclaimer, the term of this patent is extended or adjusted under 35 U.S.C. 154(b) by 0 days.

(21) Appl. No.: 14/447,236

(22) Filed: Jul. 30, 2014

(51) Int. Cl.
*B62D 55/02* (2006.01)
*B62D 55/04* (2006.01)

(52) U.S. Cl.
CPC ............... *B62D 55/02* (2013.01); *B62D 55/04* (2013.01); *Y10S 901/01* (2013.01)

(58) Field of Classification Search
CPC ........ B62D 63/02; B62D 55/02; B62D 55/04; B62D 55/075; B62J 5/00; B62J 5/005; B62J 5/007; G05D 1/021; B60B 39/00; B25J 5/005
USPC .......... 180/9.26, 9.28, 9.3, 9.32, 9.34, 21, 15, 180/209, 901; 901/1; 280/5.22, 5.28, 5.2; 446/94, 93, 95, 433, 456
See application file for complete search history.

(56) References Cited

U.S. PATENT DOCUMENTS

| | | | | |
|---|---|---|---|---|
| 1,509,030 | A * | 9/1924 | Roy | 180/6.7 |
| 4,702,331 | A * | 10/1987 | Hagihara et al. | 180/9.32 |
| 4,977,971 | A * | 12/1990 | Crane et al. | 180/8.3 |
| 6,774,597 | B1 * | 8/2004 | Borenstein | 318/568.12 |
| 7,475,745 | B1 * | 1/2009 | DeRoos | 180/9.34 |
| 7,874,386 | B2 | 1/2011 | Ben-Tzvi et al. | |
| 8,185,241 | B2 * | 5/2012 | Jacobsen | 700/250 |
| 8,216,020 | B2 * | 7/2012 | Zimet | 446/433 |
| 8,360,178 | B2 | 1/2013 | Goldenberg et al. | |
| 8,393,422 | B1 * | 3/2013 | Pensel | 180/9.46 |
| 8,800,695 | B2 * | 8/2014 | Couture et al. | 180/7.1 |
| 2006/0012144 | A1 * | 1/2006 | Kunzler et al. | 280/124.125 |
| 2006/0124366 | A1 * | 6/2006 | Le Masne De Chermont | 180/9.3 |
| 2008/0011525 | A1 * | 1/2008 | Kang et al. | 180/9.28 |
| 2010/0163323 | A1 * | 7/2010 | Pickholz | 180/65.51 |
| 2013/0078888 | A1 * | 3/2013 | Mayer et al. | 446/433 |
| 2014/0031977 | A1 | 1/2014 | Goldenberg et al. | |

* cited by examiner

*Primary Examiner* — Anne Marie Boehler
(74) *Attorney, Agent, or Firm* — Hill & Schumacher

(57) ABSTRACT

A dual mode mobile robot includes a platform and a pair of track wheel driving modules. The pair of track wheel driving modules are attached to opposing sides of the platform. Each of the track wheel driving modules has a track assembly; and a wheel assembly. Each of the track wheel drive modules is moveable from a track position to a wheel position.

20 Claims, 23 Drawing Sheets

DUAL MODE MOBILE ROBOT

FIELD OF THE DISCLOSURE

This disclosure relates to mobile robots and in particular robots that are capable of moving on various types of terrains. The mobile robot herein has a dual mode, namely a track mode and a wheel mode, and the modes can be selected by remote control or switched autonomously.

BACKGROUND

The capability of a mobile robot to travel over a wide range of terrains with minimal human interference and control, and even autonomously, is a concern for mobile robots. This is particularly true for robots that are for intended for use in unknown terrains and in a wide range of terrains. A related issue for mobile robots is to provide a robot that can be in-field repaired and maintained.

The majority of current mobile robot platforms are either wheel or track-based. Wheels are suitable for motion over smooth, plain terrain at high speed, whereas tracks are suitable for motion over unstructured terrain, stairs, and ditches at slow speed. The problem in most practical circumstances is that it may be beneficial to switch intermittently between wheels and tracks. If the terrain is unknown or unstructured, or there is a security mission in an urban setting that involves flat terrain (street) and stairs, a wheeled robot may be unsuitable and a tracked robot may be too slow if the distance to travel is large.

Some mobile robots provide manually reconfigurable track-wheeled locomotion thus offering the advantages of both types of systems; however there are limitations. Manually reconfigurable track-wheeled mobile robots require manual conversion from wheel or track configurations and vice-versa, as only one option of mobility can be used at a time. Examples of these are found in US patent application publication number 2009/0266628A1 to Schempf et al., published on Oct. 29, 2009. The inherent limitation in the use of such manually reconfigurable track-wheeled mobile robots is that the terrain must be known a priori for the operator to select one system or the other at the appropriate time during the mission.

In the case of tracked robots it is known that adding a pair of tracked flippers pivotally attached to both sides of the chassis at one or both ends or at the center of the chassis' side panels enhances the ability of the mobile robot to maneuver stairs and overcome obstacles, as shown in U.S. Pat. No. 6,263,989 issued to Won on Jul. 24, 2001 and U.S. Pat. No. 7,493,976 issued to Goldenberg et al. on Feb. 24, 2009. These robots provide remote controlled variable configuration articulated tracked vehicles to ease overcoming obstacles.

Another approach is with concurrent operation of tracks and wheels. However there are some limitations in this approach due to wheel interference while overcoming obstacles in the track mode and additional loading due to tracks in the wheel mode. Examples of this approach are shown in U.S. Pat. No. 5,022,812 issued to Coughlan et al. on Jun. 11, 1991 and in US patent application publication number 2008/0258550 to Webster et al. and published on Oct. 23, 2008.

Another approach is to run the robot on tracks, and then attach wheels on the pulleys' shafts converting the robot to wheeled, and vice-versa. However, this can only be done manually, not from a distance or autonomously.

However, all of these approaches have some limitations. Accordingly it would be advantageous to provide a dual mode mobile robot that can be easily changed remotely or autonomously from one mode to another and operates well in each mode.

SUMMARY

A dual mode mobile robot includes a platform and a pair of track-wheel driving modules. The pair of track-wheel driving modules are attached to opposing sides of the platform. Each of the track-wheel driving modules has a track assembly; and a wheel assembly. Each of the track-wheel drive modules is moveable from a track position to a wheel position.

The track assembly may include a track positioned around a drive pulley and an idler pulley and a track drive operably attached to the drive pulley.

The wheel assembly may have a rear wheel operably attached at one end of the track assembly and a swing arm operably pivotally attached to the track assembly and spaced from the rear wheel and the swing arm may have a front wheel operably attached thereto.

The swing arm may include a front roller rotatably attached to the distal end of the swing arm.

The track assembly may include a tensioning mechanism operably connected to the track.

The rear wheel may be operably connected to a rear wheel drive.

The rear wheel may be a hubless rear wheel.

The track drive may be a dual drive system having a track drive mode and a wheel drive mode and the rear wheel may be operably connected to dual drive system. The dual drive system may have one motor that is selectively connectable to a track drive shaft and a wheel drive shaft.

Each swing arm may be attached to the opposed end of the track assembly.

An arm drive motor may be operably connected to each swing arm and the arm drive motor drives and controls the angle between the track assembly and the swing arm.

Each track wheel driving module may be hingeably attached to the platform and may rotate from the track position to the wheel position.

The mobile robot may include an adaptable interface. The wheel assembly may include a pair of front swing arm mechanisms each having a front wheel at the distal end thereof and a pair of rear swing arm mechanism each having a rear wheel at the distal end thereof. The front swing arm mechanism may be pivotally attached at the front end of the track assembly. The rear swing arm mechanism may be pivotally attached at the rear end of the track assembly. The rear wheel may be operably connected to a dual drive motor and the track assembly may be operably connected to the dual drive motor and the dual drive motor selectively drives the rear wheel and the track assembly. A rear swing arm motor may be operably connected to the pair of rear swing arm mechanisms to selectively move the pair of rear swing arm mechanisms between a stowed position and the wheel position. A front swing arm motor may be operably connected to the pair of front swing arm mechanisms to selectively move the pair of front swing arm mechanisms between the stowed position and the wheel position.

The wheel assembly may include a pair of front swing arm mechanisms each having a front wheel at the distal end thereof and a pair of rear swing arm mechanism, each having a rear wheel at the distal end thereof and the rear wheel may be operably connected to a rear wheel hub motor and the drive pulley may be operably connected to the drive motor.

Furthermore, the mobile robot may include a wheel assembly which may include a pair of front swing arm mechanisms each having a front wheel at the distal end thereof and being operably connected to a front swing arm motor and a single rear swing arm mechanism having a rear wheel at the distal end thereof and the rear wheel may be operably connected to a rear swing arm motor. The rear wheel may be operably connected to a wheel hub motor. Each front wheel may be operably connected to a wheel hub motor.

Each track wheel driving modules may move from the track position to the wheel position responsive to a remote control command. Alternatively, each track wheel driving modules may move from the track position to the wheel position autonomously.

Further features will be described or will become apparent in the course of the following detailed description.

BRIEF DESCRIPTION OF THE DRAWINGS

The embodiments will now be described by way of example only, with reference to the accompanying drawings, in which.

DETAILED DESCRIPTION

Figure 1:
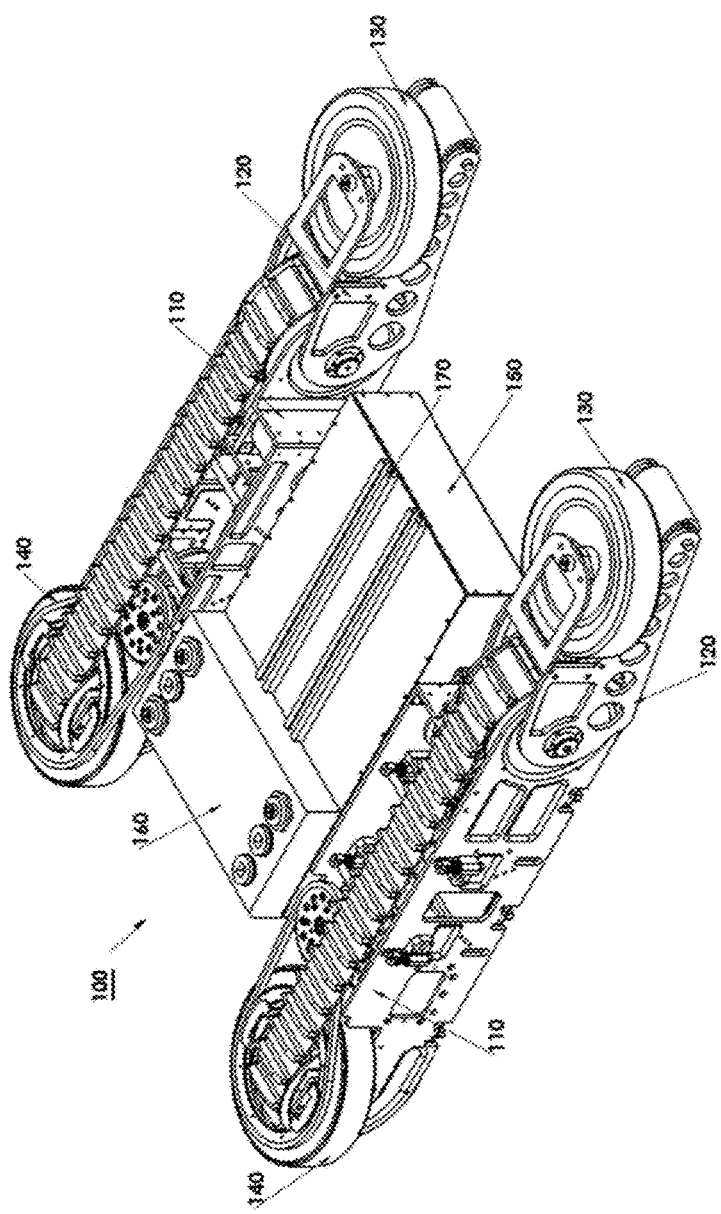
FIG. 1 is perspective view of a dual mode mobile robot.
Figure 7:
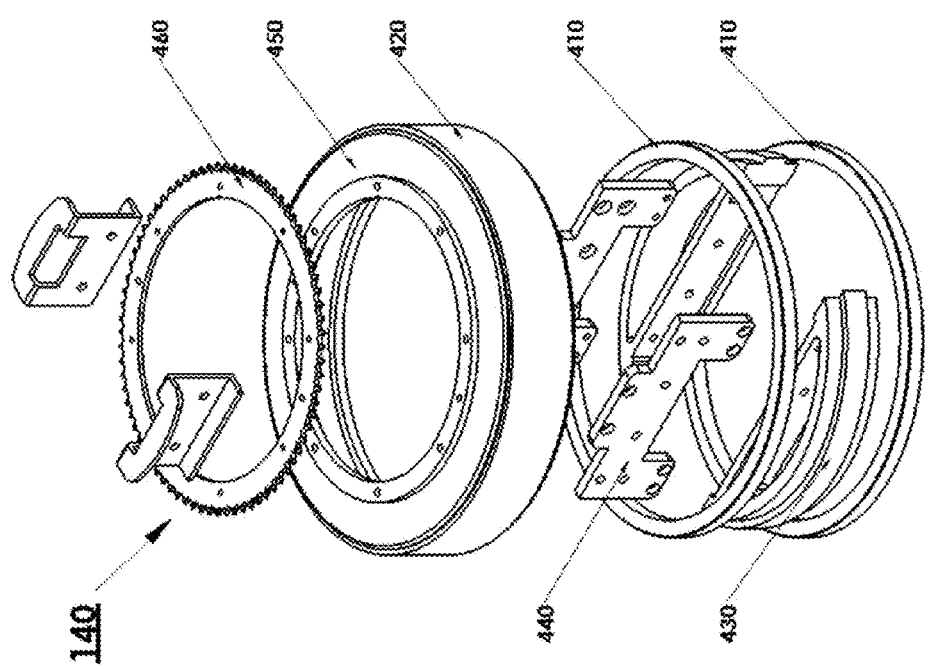
FIG. 7 is a broken apart perspective view of the hubless rear wheel of the dual mode mobile robot of FIG. 1.
Figure 8:
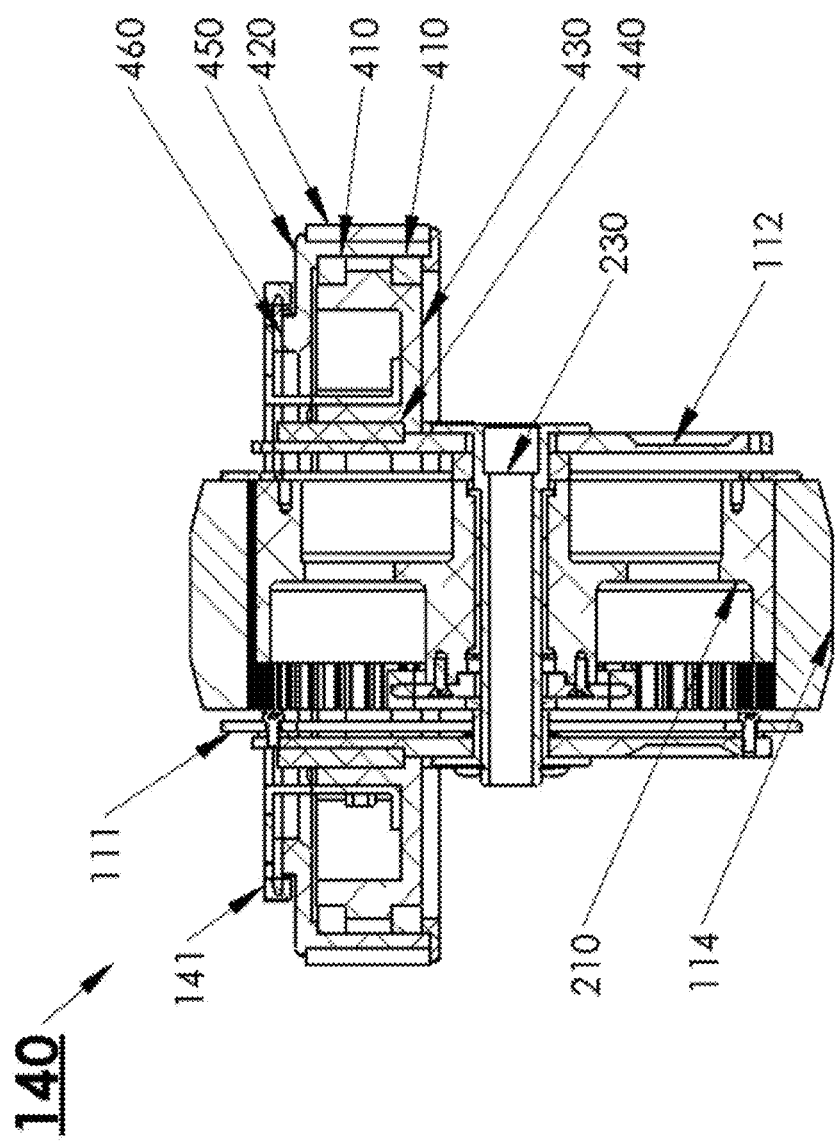
FIG. 8 is a cross sectional view of the hubless rear wheel.
Figure 9:
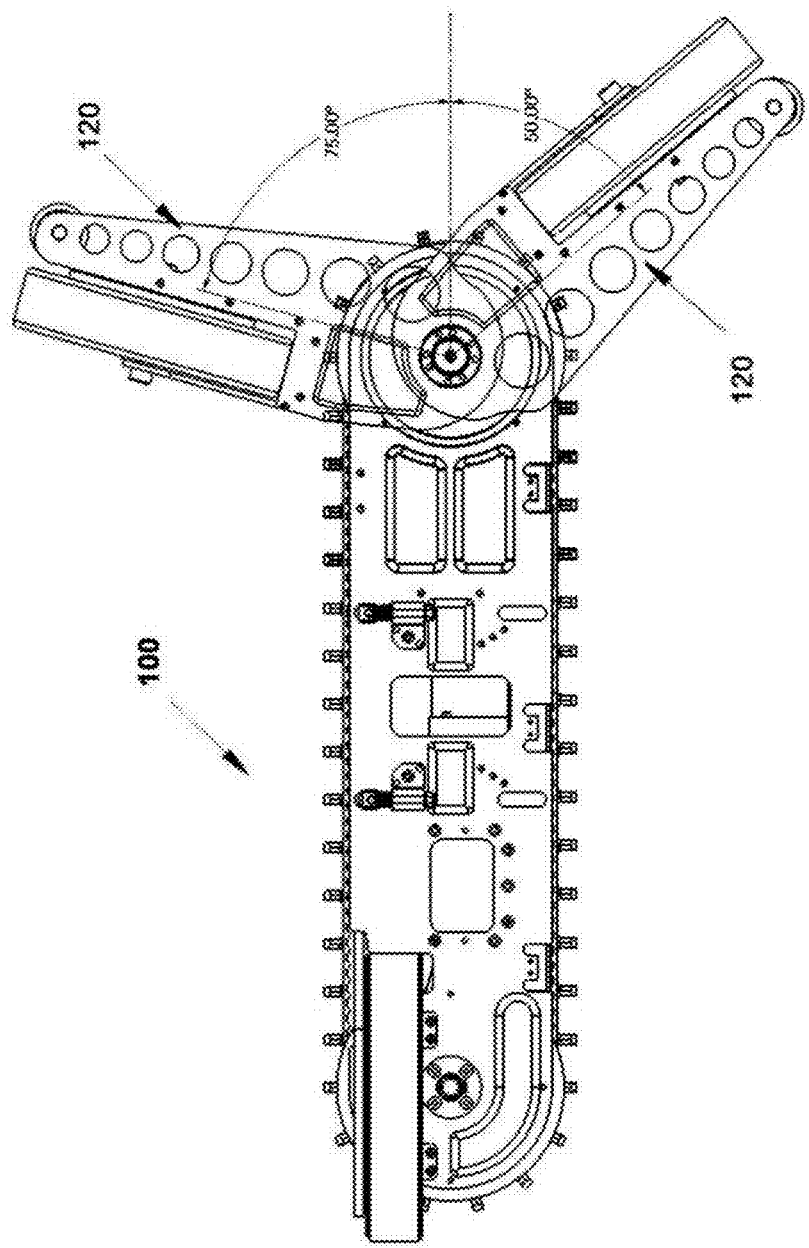
FIG. 9 is a side view of the dual mode mobile robot of FIG. 1, showing the range of the swing arm.
Figure 10:
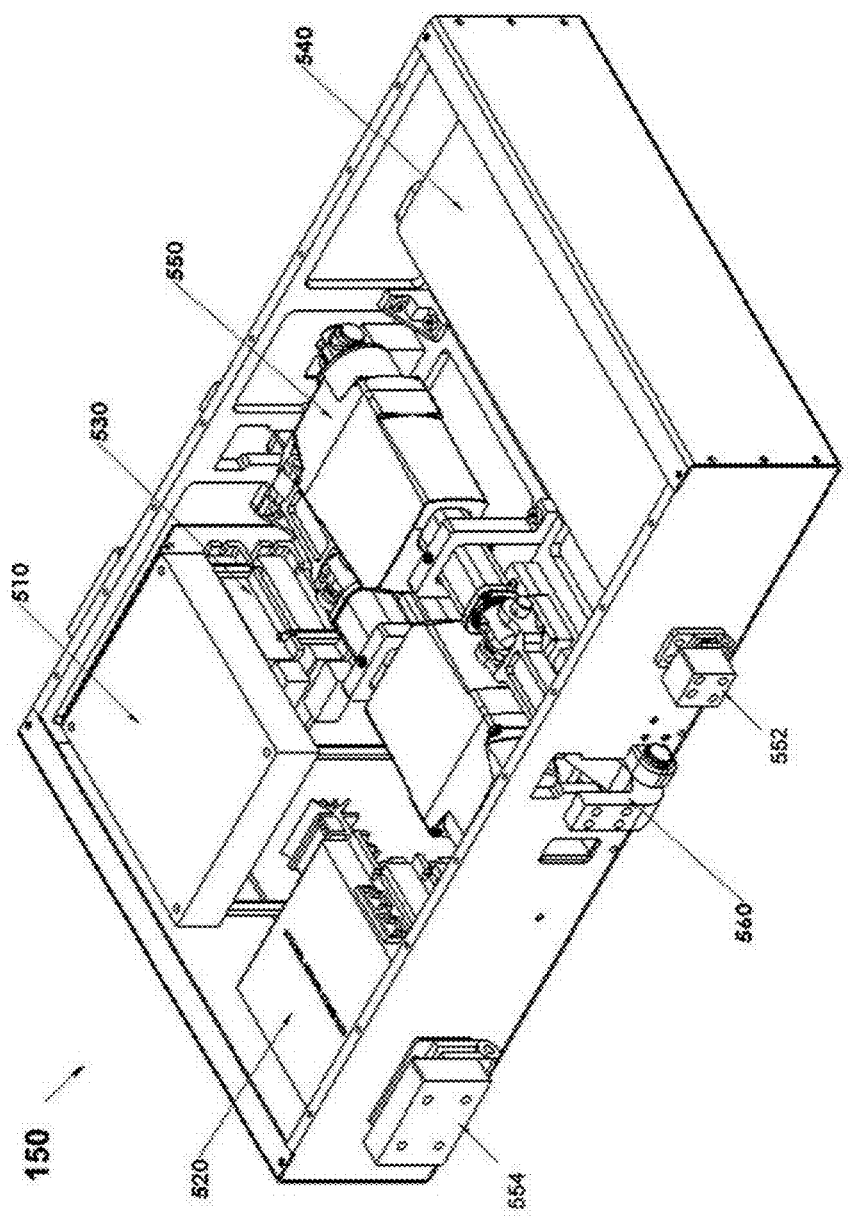
FIG. 10 is a perspective view of the central platform of the dual mode mobile robot of FIG. 1.

Referring to FIG. 1, the dual mode mobile robot is shown generally at 100. The dual mode mobile robot consists of two major components: a pair of track-wheel driving modules 110 and central platform 150. The top of central platform 150 provides the payload interface 170 for add-on attachments, such as auxiliary electronic box 160. The components and attachments are designed for easy installation by using payload interfaces. The track wheel driving modules 110 are attached to opposing sides of the central platform 150. Each track wheel driving module 110 is movable from a track position as shown in FIGS. 1, 7 and 10 to a wheel position as shown in FIG. 9.

Figure 2:
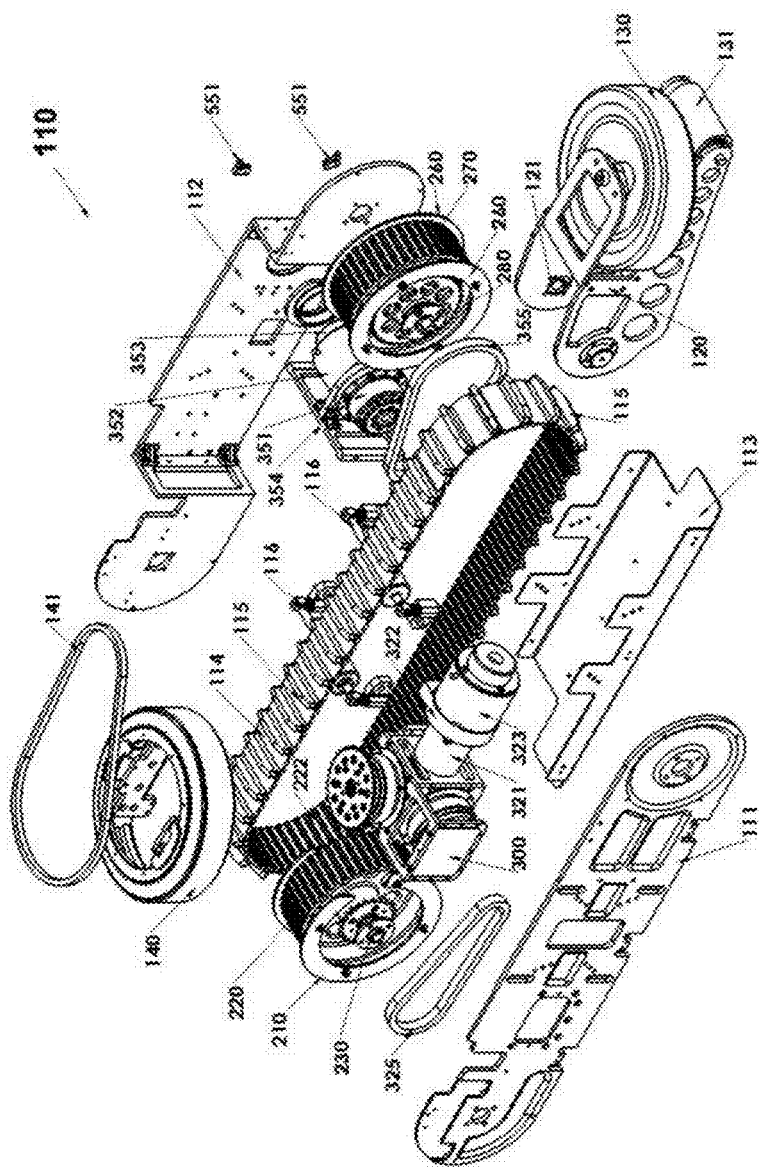
FIG. 2 is a blown apart perspective view of the track wheel driving module of the dual mode mobile robot of FIG. 1.

FIG. 2 shows a blown apart view of the track-wheel driving module 110. The track-wheel driving module 110 combines wheels and tracks that are driven separately with the same motor. It can be also easily switched between the wheel driving mode and the track driving mode. The track-wheel drive module 110 integrates one dual drive system 300 including track 114 and wheels 130 and 140, and one swing arm mechanism 120. Rear wheel 140 is attached at one end of the track assembly and the swing arm mechanism 120 is attached at the opposed end of the track assembly. The track wheel drive module 110 has three major functions, driving in two modes, steering, and climbing, in one module. This provides the dual mode mobile robot 100 with the flexibility and adaptability. The track-wheel driving module 110 includes two side plates 111 and 112 which are made from 6061-T6 aluminum to achieve sufficient strength and lower weight.

These side plates are coupled by cross members 300 and 354 and shafts 230 and 280 to form rigid structures.

In the track mode, dual mode mobile robot moves around on a pair of parallel tracks 114. In one embodiment that tracks 114 are 75 mm wide and are joined with reinforced alligator lacings. For improved tractions, the tracks have soft rubber cleats 115 spaced along their length. Each track is driven by a toothed rear drive pulley 210. Teeth 220 in each drive pulley mate with grooves 222 on the inside surface of the track. An idler pulley 270 supports each track at the front of the robot. A pair of track tensioning mechanisms 116 is located between the rear pulley 210 and front pulley 270. The track tensioning mechanism 116 provides a predetermined tension in the track 114 and allows quick replacement of the tracks. Under the track tensioning mechanisms, an aluminum board 113 with Teflon low-friction surface is attached by screws to the main frames 111 and 112 of track-wheel driving module 110 to support the inside of the bottom portion of the track.

Figure 3:
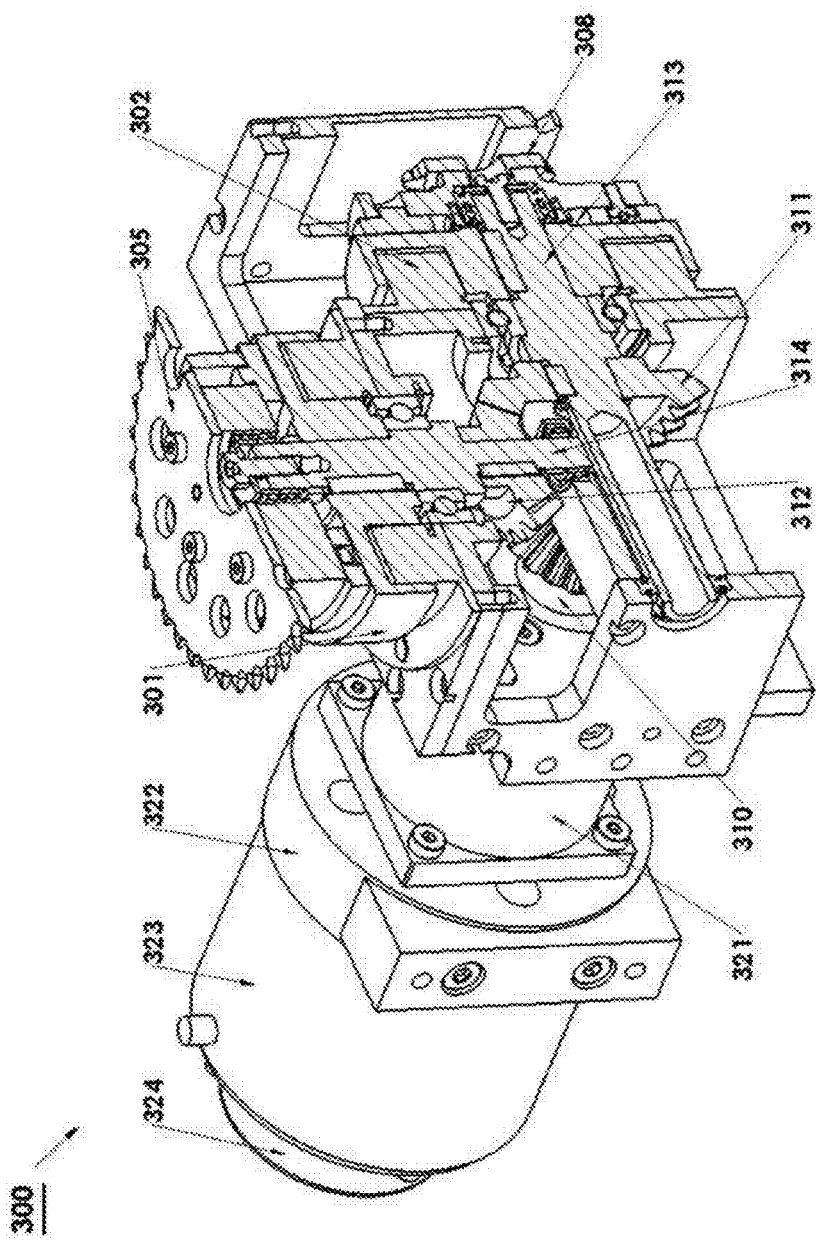
FIG. 3 is a partially broken away perspective view of a dual drive system used in the dual mode mobile robot of FIGS. 1 and 2.
Figure 4:
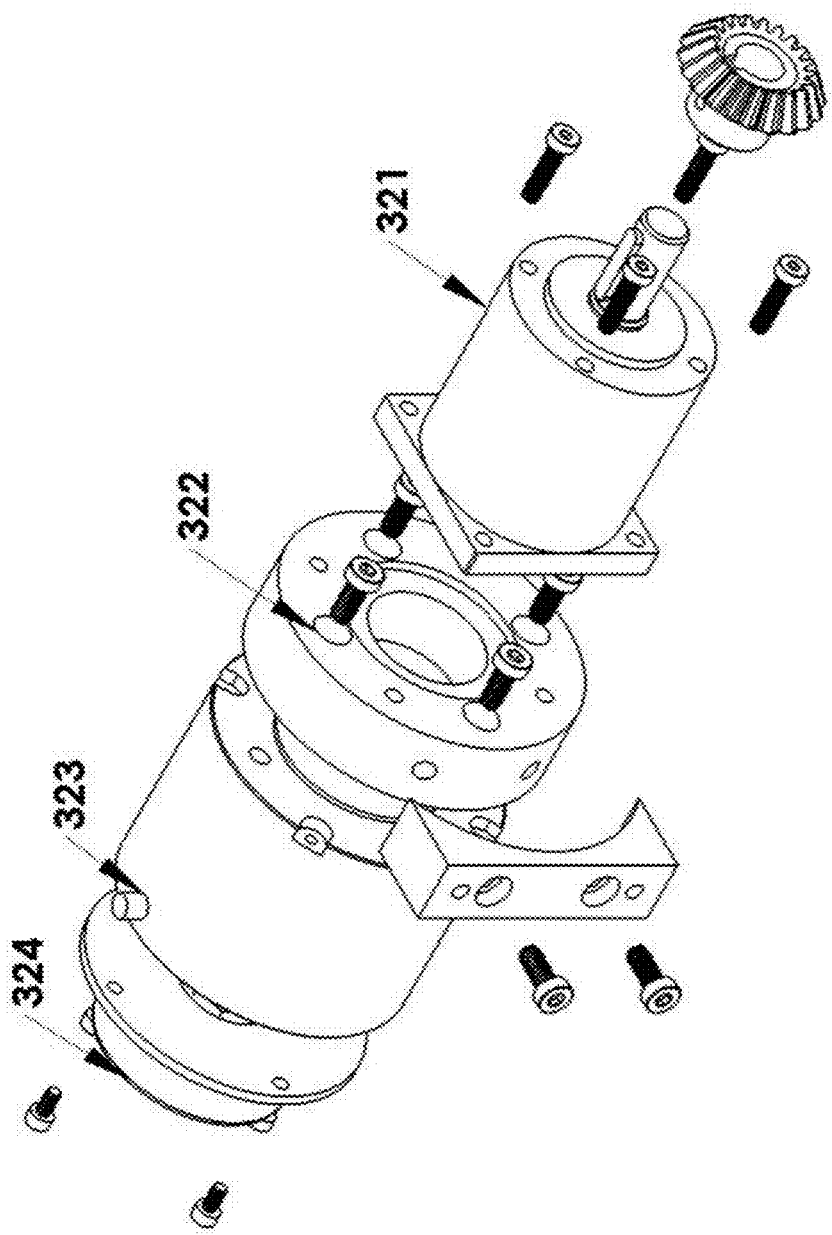
FIG. 4 is a blown apart perspective view of the drive motor portion of the dual drive system of FIG. 3.
Figure 5:
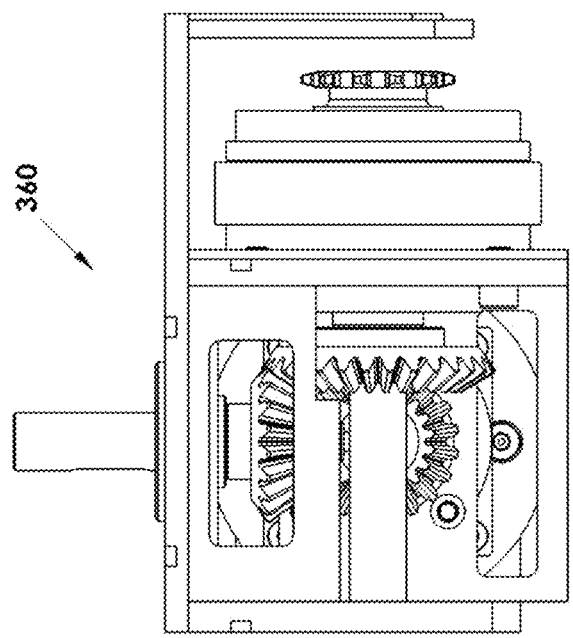
FIG. 5 is a side view of the track drive only of the dual drive of the dual drive system of FIG. 3.

As shown in FIGS. 2 and 3, each track-wheel driving module 110 has one dual drive system 300 with an identical drive motor 323 thereby the motor in the right drive module is the same as the motor in the left drive module. The drive motor 323 is geared down through a planetary servo gearhead 321 through an adaptable interface 322. Each drive motor 323 is also equipped with a spring applied break 324. The dual drive system is customizable and upgradeable. The adaptable interface 322 is designed to be compatible with other models of drive-train. More specifically, the design and layout of the dual drive system is compatible with other models of drivetrain and reconfigurable to other states. Alternative versions of the dual drive system can use different types of drive motors and gearheads. Referring to FIG. 4, the drive motor 323 may be 482 watt brushless DC motor (BN34-35EU-02, from Moog Components Group) and a 1:10 ratio planetary servo gearhead 321 (Accu Drive E40/E60, from Cone Drive Operations Inc.). Alternatively drive motor 323 may be 363 Watt motor (M8WQ90-03E4-008HZ) and gearhead 321 may be 1:20 ration (Accu Drive E60). The dual drive motor 323 is selectively connectable to the track drive shaft 313 and the wheel drive shaft 314. To achieve the dual drive function, three bevel gears 310, 311 and 312 are used to transfer the motion to two output shafts at a 90-degree angle to the input shaft. As shown in FIG. 3, A 1:1.5 ratio bevel gear set (310 and 311) transfers the motion to the output shaft 313 and amplifies the torque capacity required for propelling the pulley 210 that drive the track 114. Output of track drive shaft 313 is operably connected to shaft 230 with drive chain 325. Further, the motion is transmitted through a 1:1 ratio bevel gear set (310 and 312) to output or wheel drive shaft 314 for driving the sprocket 305 that drives the rear wheel 140. Output shaft 314 is operably connected to wheel 140 with drive chain 141. Two electromagnetic clutches 301 and 302 switch between the two output shafts to provide wheel and track driving mode separately. Also, the dual drive system 300 can be configured easily into a single drive system, either track drive 360 or wheel drive 350, simply removing the clutch assemblies (301 or 302), as shown in FIGS. 4 and 5 respectively. For example, the robot described herein may be initially purchased with a single drive system and then reconfigured to a dual drive system.

Figure 6:
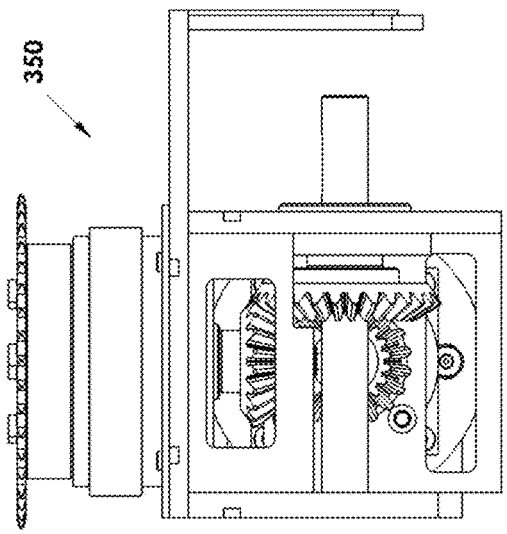
FIG. 6 is a side view of the wheel drive only of the dual drive of the dual drive system of FIG. 3.

A blown apart view of the hubless rear wheel 140 is shown in FIG. 6. Since traditional wheels have a hub in the center and spin around a central axis, the wheel and central axis will interfere with the pulley. To provide adequate space for the pulley 210 and track 114, the rear wheel 140 has been innovatively designed as a hubless wheel. The outer frame 450 has a tire 420 on the outside thereof. The hubless rear wheel 140 is supported by the outer rings of two thin section ball bearings 410. The inner rings of the thin section ball bearings attach to the track-wheel driving module's frame 111 and 112 (shown in FIG. 2) via supporting blocks 430 and 440. A sprocket 460 is fixed on the outer frame 450 of hubless rear wheel. A chain drive system 141 operably connects sprocket 460 with shaft 314 (shown in FIG. 3) and is used to convey power to the rear wheel 140 in the dual mode mobile robot's wheel mode. The hubless rear wheel 140 is supported by the outer rings of two thin section ball bearings 410. The inner rings of the thin section ball bearings attach to the track-wheel driving module's frame 111 and 112 (shown in FIG. 2) via supporting blocks 430 and 440. A sprocket 460 is fixed on the outer frame 450 of hubless rear wheel.

The track-wheel driving module 110 includes a swing arm mechanism 120 (or flipper) as best seen in FIGS. 1 and 2. It includes an arm 121, a front wheel 130 and front roller 131. The front roller is rotatably attached to the distal end of the arm 121. The front wheel 130 is rotatably attached to the swing arm and is rotatable orthogonally to the front roller 131. The proximal end of the arm 121 is pivotally coupled to the main frame of the track-wheel driving module about a transverse shaft 280 that is perpendicular to the sides of the main frame 111 and 112.

The swing arm mechanisms 120 are coupled to the main frame of the track-wheel driving module such that they can rotate in front of the tracks (limited degrees in the range −50 to +75 in one embodiment), as shown in FIG. 9. Referring to FIG. 2, the two swing arm mechanisms 120 can be rotated individually or synchronously by two arm drive motors 352. An arm drive motor 352 is used to drive and control the angle between arm and main frame of the track-wheel driving module. The motion is transmitted through a high ratio harmonic drive 351 and a drive chain 355 as an additional transmission stage in order to achieve greater torque output and transfer to the transverse axle 280. Each arm drive motor 352 is also equipped with a spring applied break 353. Two limit switches 551 with hinge roller lever are utilized to limit the rotation range and prevent the collision between swing arm 120 and main frame 112.

To achieve a low and forward positioned center of gravity, the volume of the central platform 150 has been divided into three sections as shown in FIG. 10. All the light-weighted electronic components, such as controller 520, drivers 530 and power distribution board 510 are located in the rear section. The rotation mechanism including linear actuators 550 is placed in the middle section. The front section is reserved for battery 540.

Figure 11:
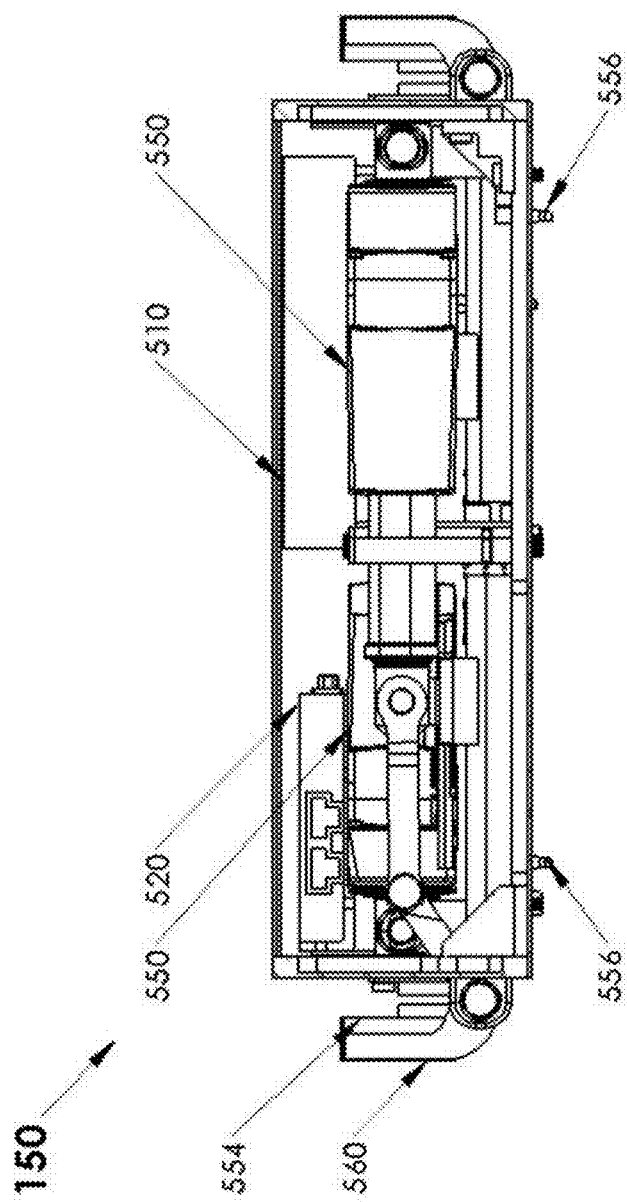
FIG. 11 is a cross sectional view of the central platform of the dual mode mobile robot of FIG. 1.

The rotation mechanism is used to convert the dual mode mobile robot from the wheel mode into the track mode, vice versa. This mechanism consists of two linear actuators 550 and slider-crank mechanisms 560, as shown in FIG. 11. Preferably the linear actuator model has a self-locking feature and thus the track-wheel driving modules can be fixed in position all the time. More specifically the linear actuator has a worm gear mechanism to provide the self-locking feature. Therefore the robot can stop and hold at any position during the transition.

The slider-crank mechanism is used to convert the linear motion of the linear actuator to rotational motion of the track-wheel driving module. Referring to FIG. 11, the linear actuator 550 pushes the slide-crank mechanisms 560. The other end of slide-crank mechanism 560 is coupled with the dual drive system 330. The slide-crank mechanism 560 is used to convert the linear motion of the linear actuator 550 to rotational motion of the track-wheel driving module.

The built-in electrical end stop sensor of linear actuator and limit switches 556 which are located under the central platform are used to limit the rotational motion in the 0-90 degree range. In addition, hinge 552 and 554 are connected between the central platform 150 and the track wheel drive module 110. The track wheel assemblies 110 are hingeably attached to central platform 150 and the track wheel assemblies rotate from the track position to the wheel position.

Figure 13:
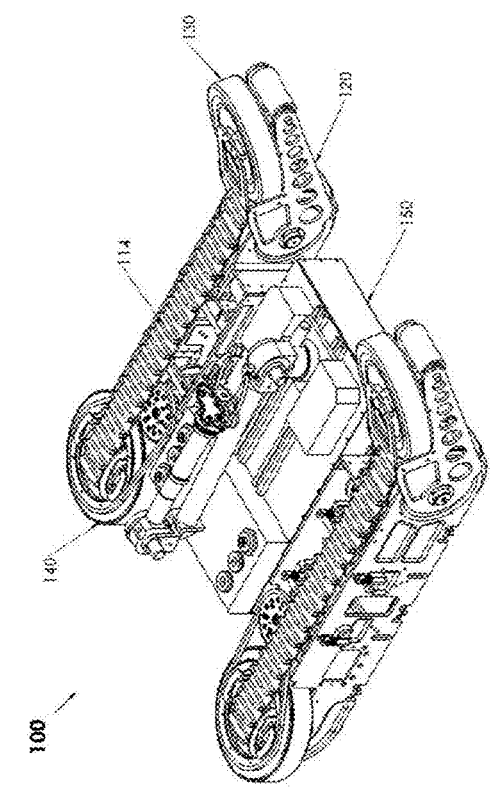
FIG. 13 is a perspective view of the dual mode mobile robot in the track mode.
Figure 12:
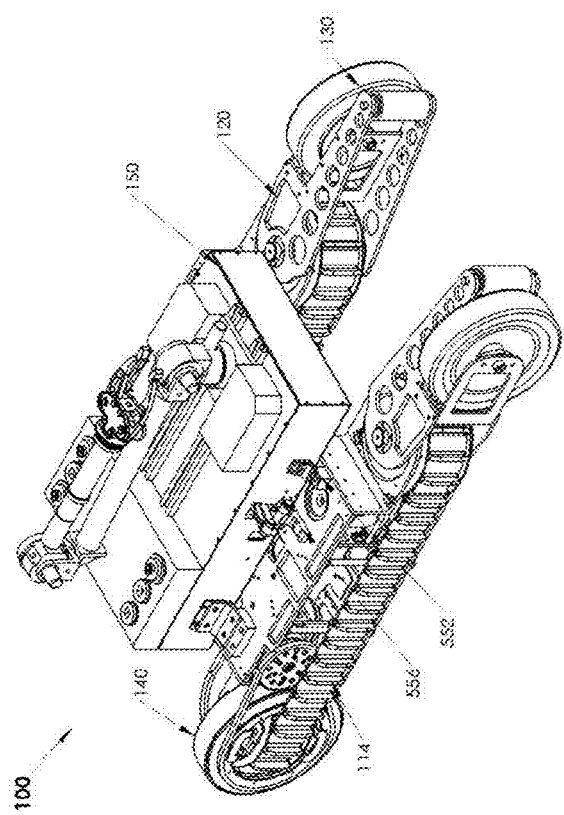
FIG. 12 is a perspective view of the dual mode mobile robot in the wheel mode.

Dual mode mobile robot can convert from a tracked robot into a wheeled robot by rotating the track-wheel driving module 90 degrees under the user command. By way of example, in a test of one embodiment each of these changes was achieved in 25 seconds, respectively. FIGS. 12 and 13 show the configurations of track mode and wheel mode of dual mode mobile robot respectively.

Extensive tests have been performed in outdoor and indoor environments in order to verify the interchange mode's capability and durability. By way of example, the prototype can change from track mode to wheel mode, and vice versa, on various surfaces, such as marble, carpet, concrete, gravel, and natural terrain.

Figure 14:
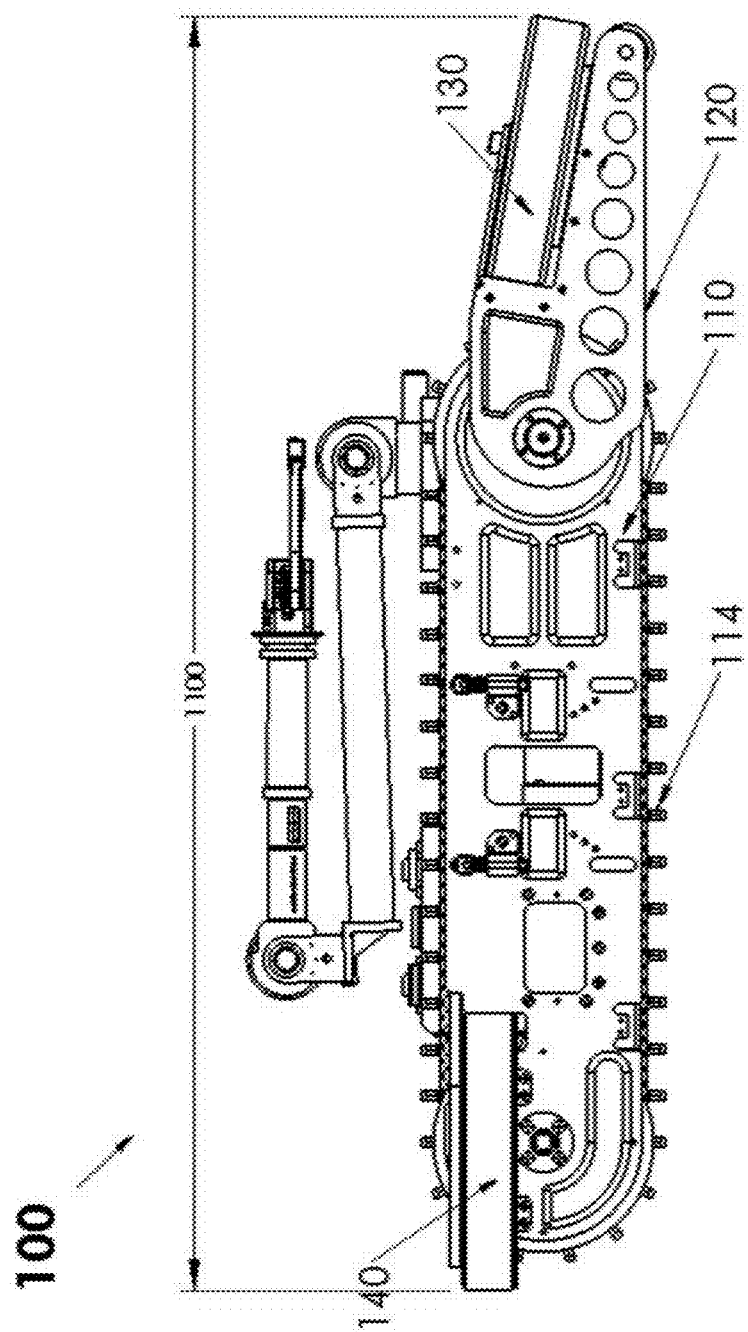
FIG. 14 is a side view of the dual mode mobile robot in the track mode with the swing arm in the extended position.
Figure 15:
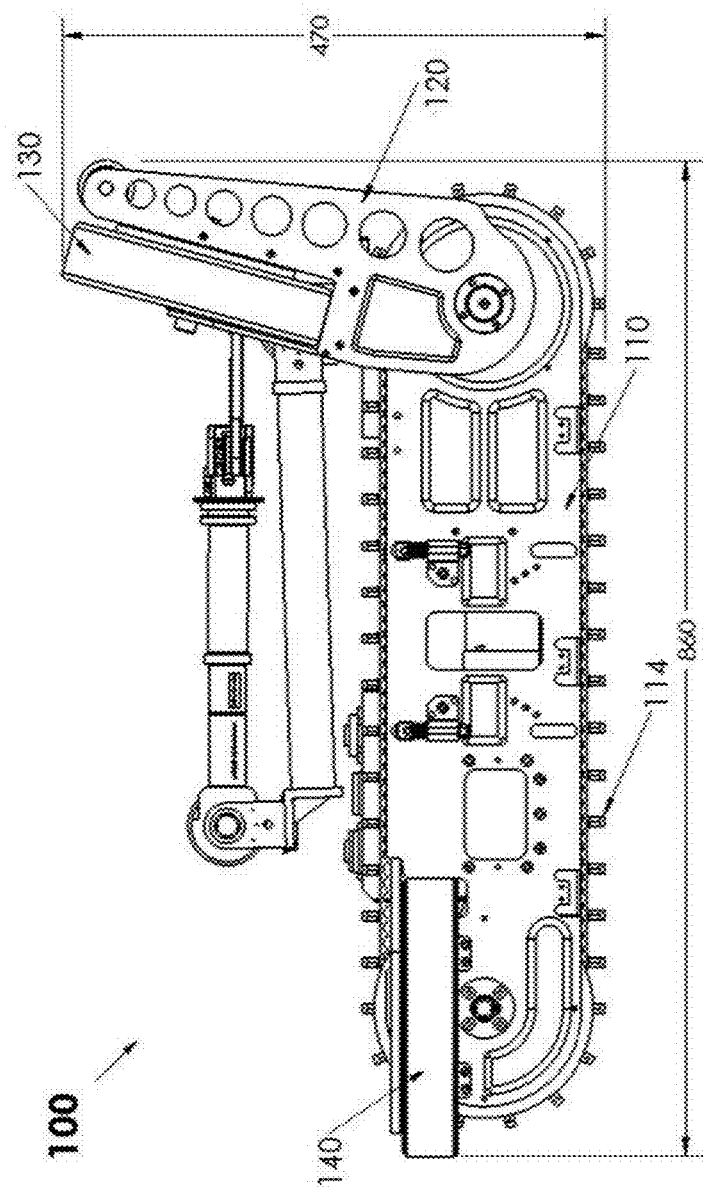
FIG. 15 is a side view of the dual mode mobile robot in the track mode with the swing arm in the stowed mode.

The dual mode mobile robot 100 is a very versatile mobile robot. It can be used in the extended mode as shown in FIG. 11 or the stowed mode as shown in FIG. 12. The longest possible length that can be achieved is the extended mode shown in FIG. 14 and in one embodiment that is 1100 mm. This mode is useful in a stair-climbing and ditch-crossing maneuver. The fully extended length can provide better stability. In the other hand, to minimize the volume during transportation, the dual mode mobile robot can be set to its stowed mode, and the payload such as manipulator can be folded as well. In the embodiment shown in FIG. 15, the stowed dimensions of the dual mode mobile robot in this embodiment are width 0.89 meters, height 0.47 meter and length 0.86 meters. Therefore, the overall stowage volume of the dual mode mobile robot in this embodiment with payloads is 0.36 $m^3$ as depicted in FIG. 15.

Figure 16:
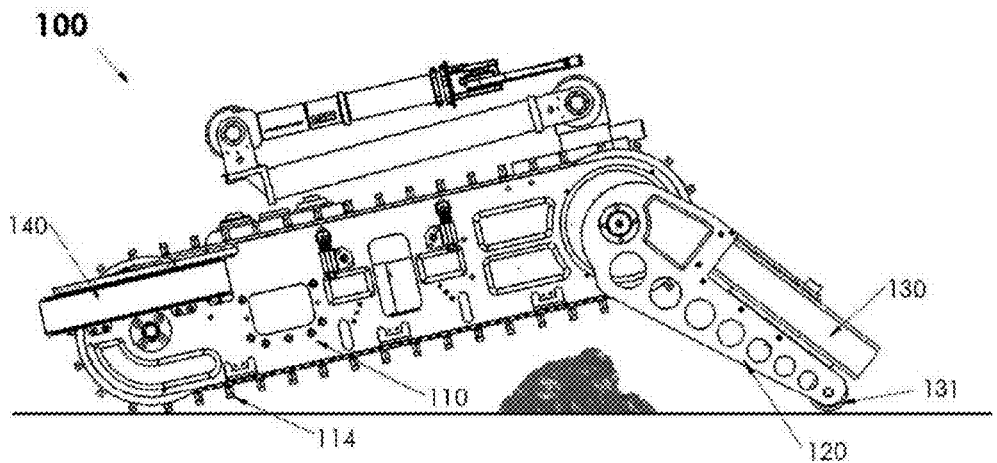
FIG. 16 is a side view of the dual mode mobile robot in the track mode with the swing arm in the extended position in the push up mode and showing how it can facilitate clearance of an obstacle.
Figure 17:
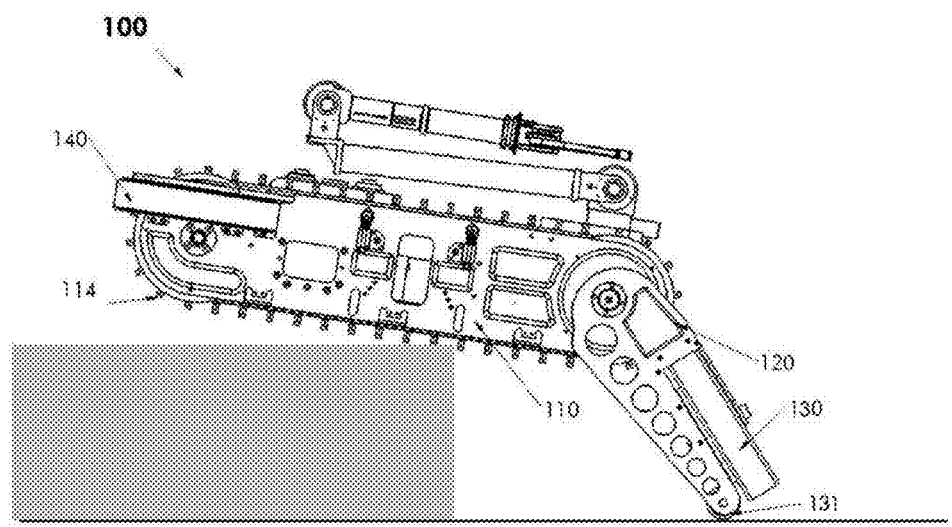
FIG. 17 is a side view of the dual mode mobile robot in the track mode with the swing arm in the extended position in the push up mode and showing how it can aid in supporting the robot.

The dual mode mobile robot 100 can deploy the swing arm mechanisms 120 to raise the forward end of main body in a push-up mode, as shown in FIG. 16. This posture can directly increase the height of sensors and camera on the platform. Moreover, this mode is also important for enhancing the dual mode mobile robot's terrain adaptability. Since the ground clearance, in the embodiment discussed above, is 57 mm which is a relatively small clearance under the central platform. The dual mode mobile robot may lose traction when it traverses some large obstacles. As shown in FIG. 16, the push-up mode can significantly increase ground clearance to recovery from the stuck situation. The push-up mode also can be used to support the dual mode mobile robot 100 when it is off the large obstacle, as shown in FIG. 17. In addition, with the help of rollers 131 in the swing arm mechanisms 120, the dual mode mobile robot 100 can travels on four points of contact to reduce energy consumption by minimizing the contact length of tracks with the ground in push-up mode.

The dual mode mobile robot 100 may be configured to allow all wheels, 130 and 140 thereof to freewheel. In one embodiment, upon command or power off, the clutches 301 and 302 are not engaged and thus robot 100 can be pushed or towed without damaging the mechanism. This mode can be used in the event of towing the dual mode mobile robot 100 to its desired location to start the mission or after a failure in the drive mechanism.

Figure 18:
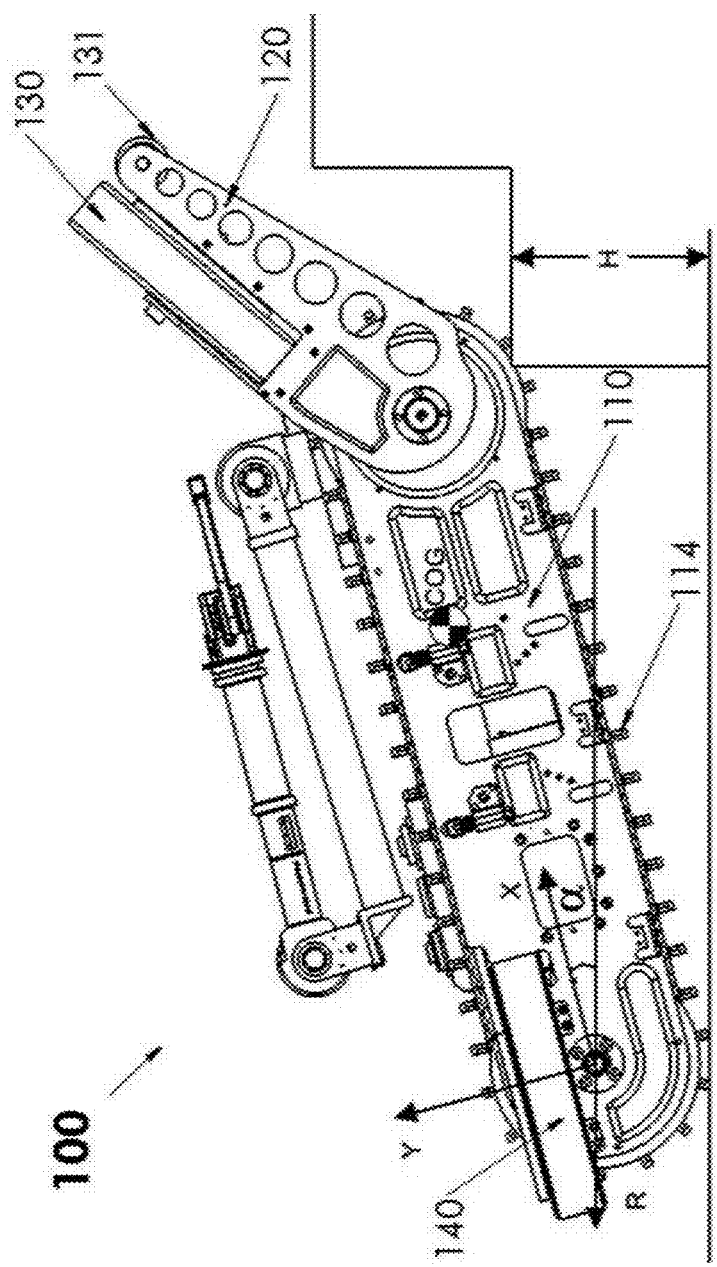
FIG. 18 is a side view of the dual mode mobile robot in the track mode with the swing arm shown in a configuration for climbing stairs.

The dual mode mobile robot 100 can climb stairs by using its tracked chassis and swing arm mechanisms 120. At first, both sides of the swing arm mechanisms 120 pivot synchronously to raise the arm higher than the rise of the first stair as shown in FIG. 18. Then the robot 100 drives the tracks forward until the swing arm mechanisms 120 and tracks 114 contact the first stair one after another. When the tracks contact the first stair, the swing arm mechanisms 120 can pivot to the position of extended mode. The robot 100 can continue to ascend the stairs.

Figure 20:
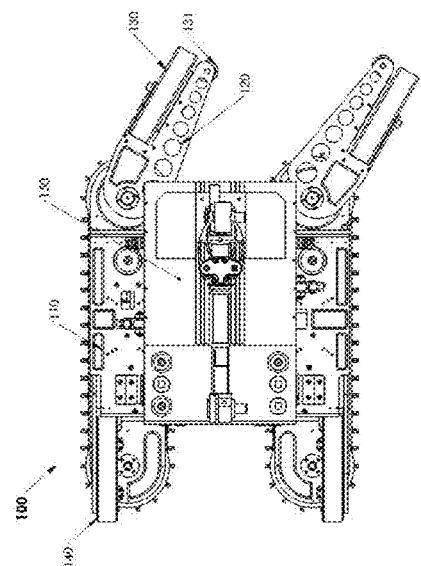
FIG. 20 is a top view of the dual mode mobile robot in the wheel mode and showing the independent steering.
Figure 19:
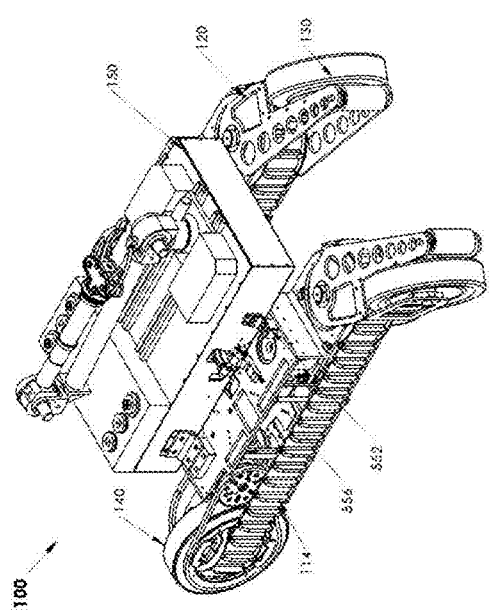
FIG. 19 is a perspective view of the dual mode mobile robot in the wheel mode showing independent steering.

In the track mode, the dual mode mobile robot 100 is controlled using left and right drive motors. The steering in this mode is accomplished using differential speed of the tracks on either side of the robot. In addition, tracks which are separated sufficiently for efficient skid steering can give higher maneuverability. The robot can turn in place with no forward or backward movement by driving the tracks in opposite directions. This makes it easier to maneuver in cramped quarters. Independent steering is used in the wheel mode. It coordinates the angle of the two front wheels 130 to the desired heading by controlling the swing arm mechanisms 120 individually, as shown in FIGS. 19 and 20. As a result, the dual mode mobile robot can move in a car-like fashion in high speed. Independent steering allows efficient maneuvering and reduces the effect of internal losses, comparing with skid steering.

Figure 21:
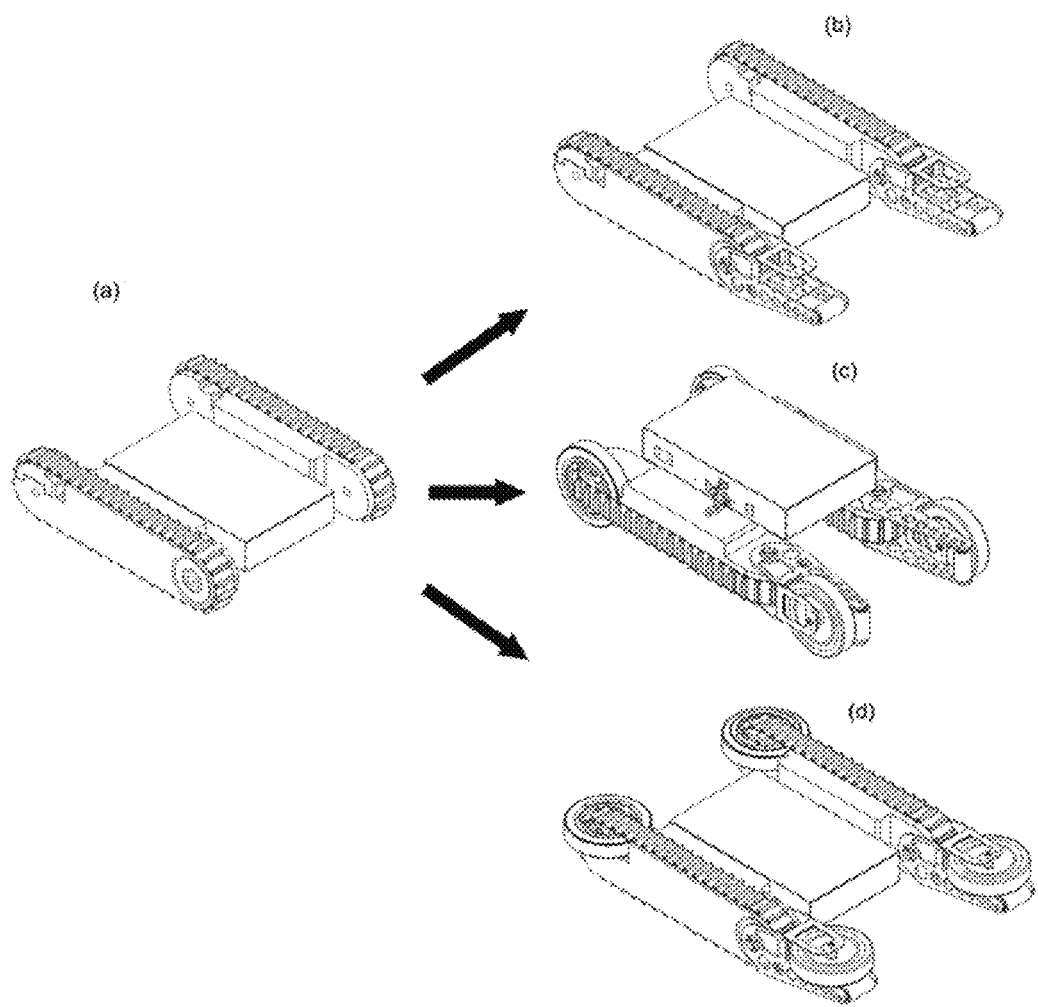
FIG. 21 is a perspective of four different configurations of mobile robots showing a) a tracked mobile robot; b) tracked mobile robot with a flipper; c) a wheeled mobile robot; and d) a dual mode mobile robot.

The dual mode mobile robot can be configured to drive in four configurations as shown in FIG. 21, namely a) a tracked mobile robot; b) tracked mobile robot with a flipper; c) a wheeled mobile robot; and d) a dual mode mobile robot. Furthermore, users can easily modify or upgrade the dual mode mobile robot 100 that has already been created to achieve these configurations.

The tracked mobile robot configuration in FIG. 21(*a*) is the simplest configuration of dual mode mobile robot 100. The platform consists of two driving modules 110 and one central platform 150. The driving module 110 is simplified from track-wheel driving module by removing several wheel components, such as hubless rear wheel, swing arm mechanism. The central platform does not include the rotation mechanism. Tracked mobile robot configuration has the least components and the lowest cost. It provides a basic locomotion function which is similar to most of conventional tracked mobile robots.

Tracked mobile robot with swing arm configuration in FIG. 21 *b*) is based on the tracked mobile robot configuration. Two swing arm mechanisms 120 and their driving systems have been added on the driving modules. Since the swing arm mechanism 120 can be used as a flipper to lift the robot's nose up to climb stairs and overcome obstacles, this configuration of dual mode mobile robot enhanced its ability of obstacle surmounting.

Wheeled mobile robot configuration in FIG. 21 *c*) is different than the tracked mobile robot configuration. The platform consists of two driving modules 110 and one central platform 150. The driving module in this configuration is another version which is modified from track-wheel driving module by removing several track components, such as track, track tensioning mechanism. The swing arm mechanism 120 is acting as a steering system similar to car steering.

The rotation mechanism in the central platform and two track-wheel driving modules provide this unique track-wheel dual mode mobile robot in FIG. 21 *d*). The dual mode mobile robot 100 can quickly convert from a tracked robot into a wheel robot by rotating the track-wheel driving module 90 degrees. Dual track-wheel mobile robot configuration has a complex configuration that requires more components and has higher cost. However, this configuration maximized the advantages of providing intermittently tracked and wheeled drives.

Figure 22:
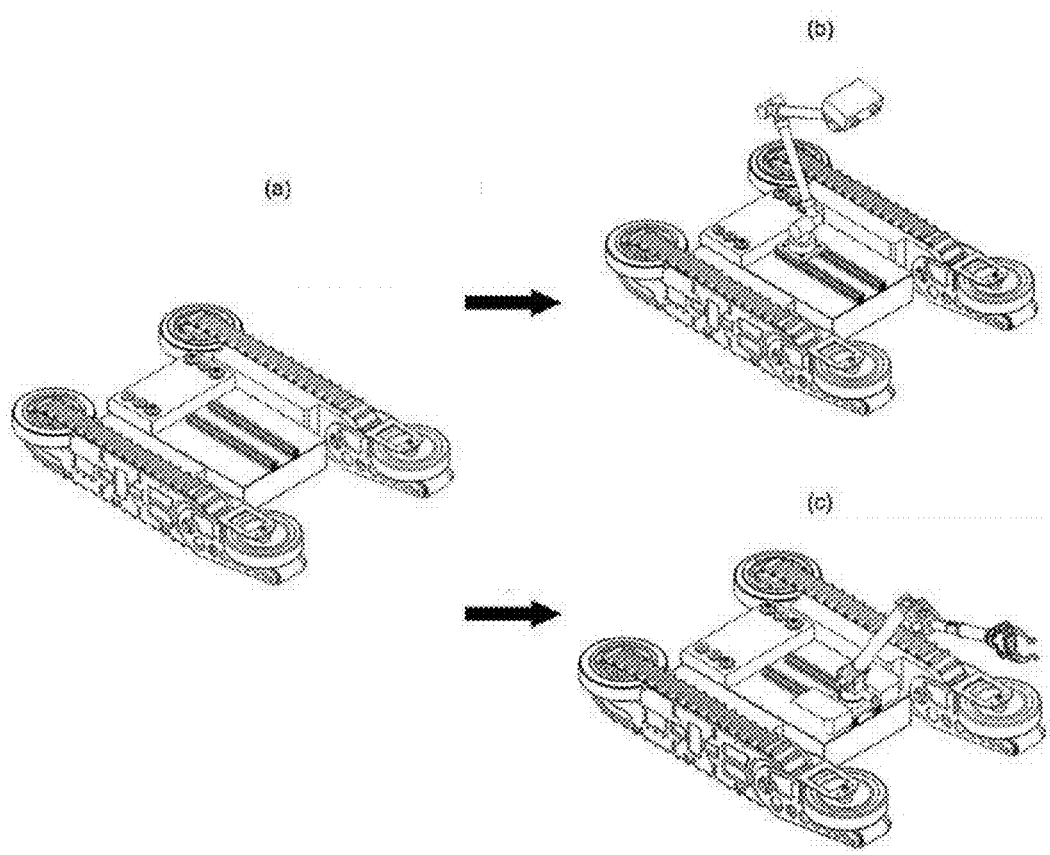
FIG. 22 is a perspective view of four different configurations of the dual mode mobile robot showing a) the dual mode mobile robot; b) the dual mode mobile robot with interfaces for payloads; c) the dual mode mobile robot with a surveillance kit attached to an interface; and d) the dual mode mobile robot with a manipulator attached to an interface.

The interior of central platform 150 of dual mode mobile robot 100 is populated by a set of common components and interfaces that are shared by a set of configurations to achieve multiple functions as shown in FIG. 22. Add-on modules, such as manipulator, surveillance camera, etc., can be mounted on the platform in accordance to requirements and missions. These changes would not impact on other parts of the existing dual mode mobile robot since all add-on modules are independent and self-contained.

The physical connections of the add-on modules are especially designed so that they permit easy assembly and disassembly. An adaptable interface 170, which is a interface between central platform and an add-on module or among variants of add-on modules such as auxiliary electronic box 160, may be used. By utilizing interfaces between the central platform and various add-on modules, the dual mode mobile robot can accommodate customization and upgrading as well as achieve new functionalities based on new add-on modules without changing the rest of mobile robot. FIG. 22 shows several typical additional modular functions that can be added via adaptable interface of dual mode mobile robot. By way of example only some examples are shown in FIG. 22, namely a) the dual mode mobile robot; b) the dual mode mobile robot with interfaces for payloads; c) the dual mode mobile robot with a surveillance kit attached to an interface; and d) the dual mode mobile robot with a manipulator attached to an interface.

An alternate embodiment of a dual mode mobile robot is shown generally at 600 in FIGS. 23 to 29. Dual mode mobile robot 600 is similar to robot 100 described above in that they both have track wheel drives that are moveable between a track position and a wheel position. However, the track-wheel driving modules are different for the different robots. In this embodiment the wheels are parallel to the tracks.

In regard to dual mode mobile robot 600 only those portions that are different from robot 100 will be described in detail. The main features of central platform 650 are similar to those found in central platform 150.

Figure 23:
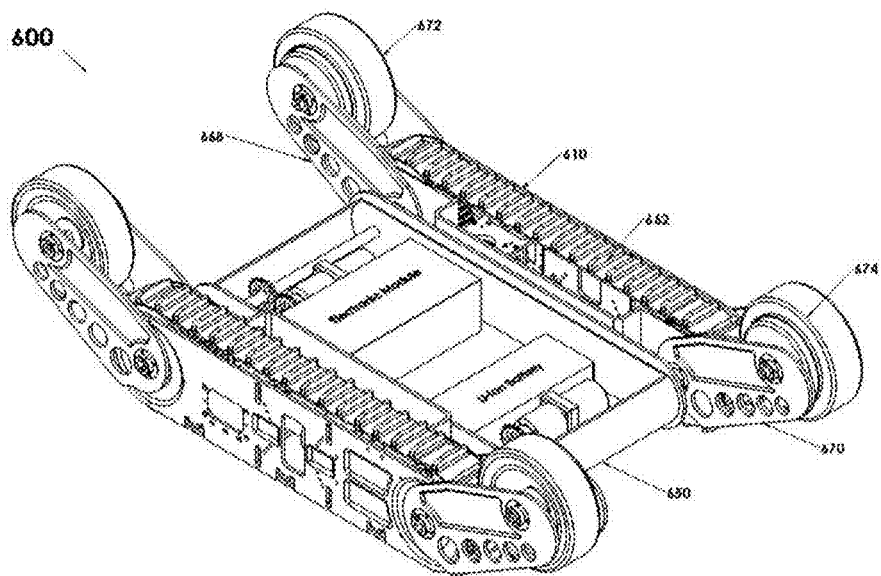
FIG. 23 is a perspective view of an alternate embodiment of a dual mode mobile robot having a parallel track and wheel configuration and showing the track mode.
Figure 24:
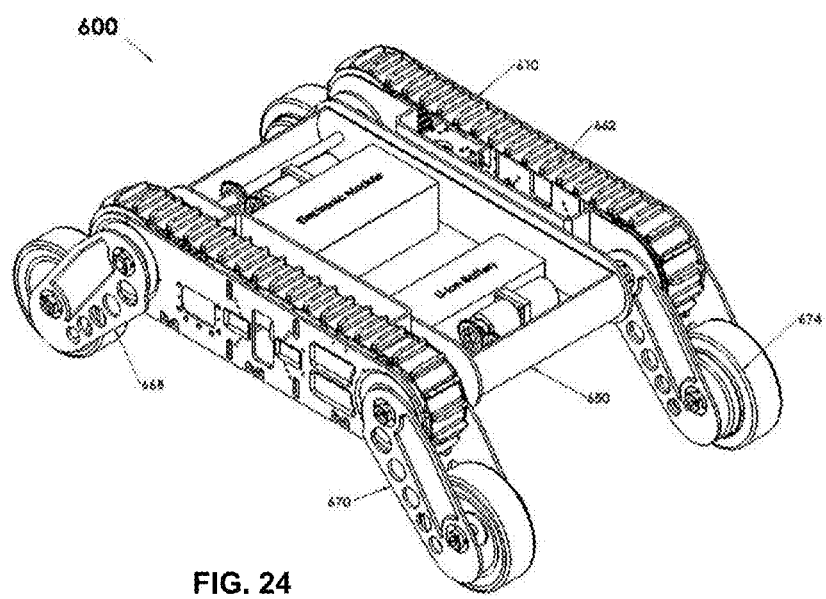
FIG. 24 is a perspective view of the dual mode mobile robot of FIG. 23 and showing the wheel mode.
Figure 25:
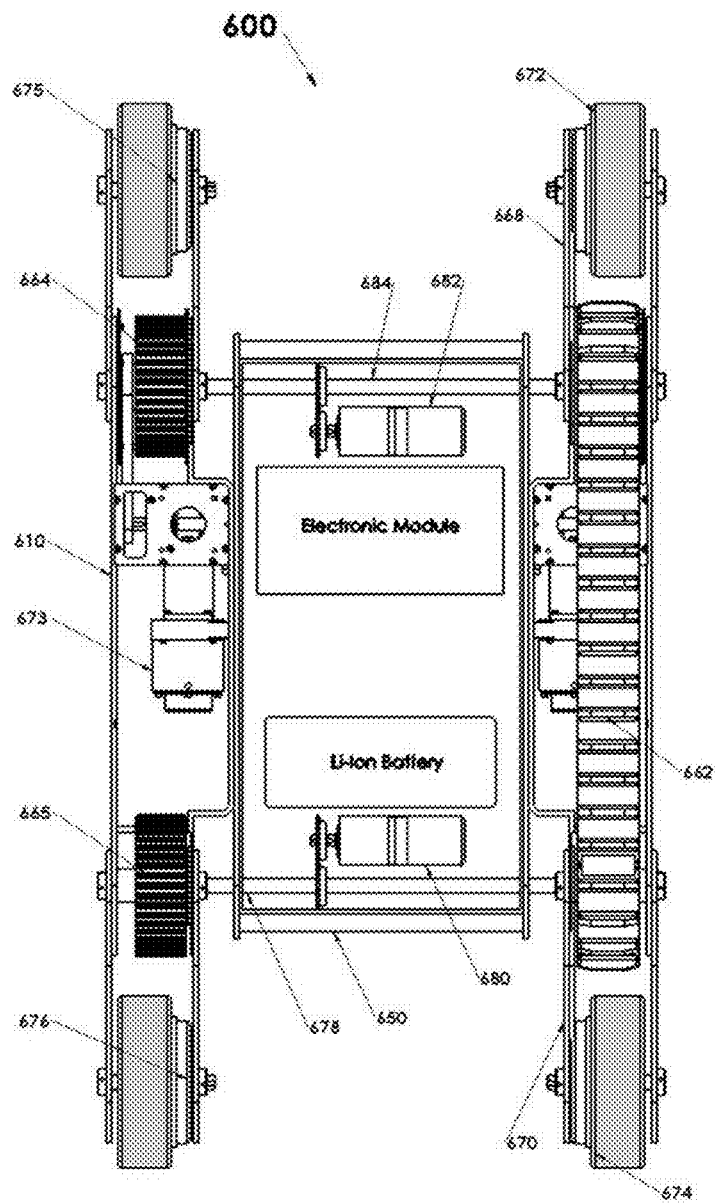
FIG. 25 is a top view of the dual mode mobile robot of FIGS. 23 to 24 and showing the track wheel drive modules on either side thereof.

Dual mode mobile robot 600 includes two major components: a pair of track-wheel driving modules 610 and a central platform 650. The track wheel driving modules 610 are attached to opposing sides of the central platform 650. FIG. 23 shows the track drive mode and FIG. 24 shows the wheel drive mode for dual mode mobile robot 600.

Each track-wheel driving module 610 includes a track assembly 660. The track assembly includes a track 662 which is driven by a rear drive pulley 664. The track 662 and rear drive pulley 664 could be similar to that described above. The rear drive pulley 664 is operably connected to drive motor 673. The track 662 is positioned around the drive pulley 664 and an idler pulley 665.

The track-wheel driving module 610 includes a wheel assembly which includes a rear swing arm mechanism 668 and a front swing arm mechanism 670. The rear swing arm 668 is pivotally connected to the track assembly at the rear end thereof. Rear swing arm 668 includes a rear wheel 672 at the distal end thereof. Rear wheel 672 is operably connected to rear wheel hub motor 675. Front swing arm mechanism 670 is pivotally connected to the track assembly at the front end thereof. Front swing arm 670 includes a front wheel 674 at the distal end thereof which is operably connected to front wheel hub motor 676.

Figure 26:
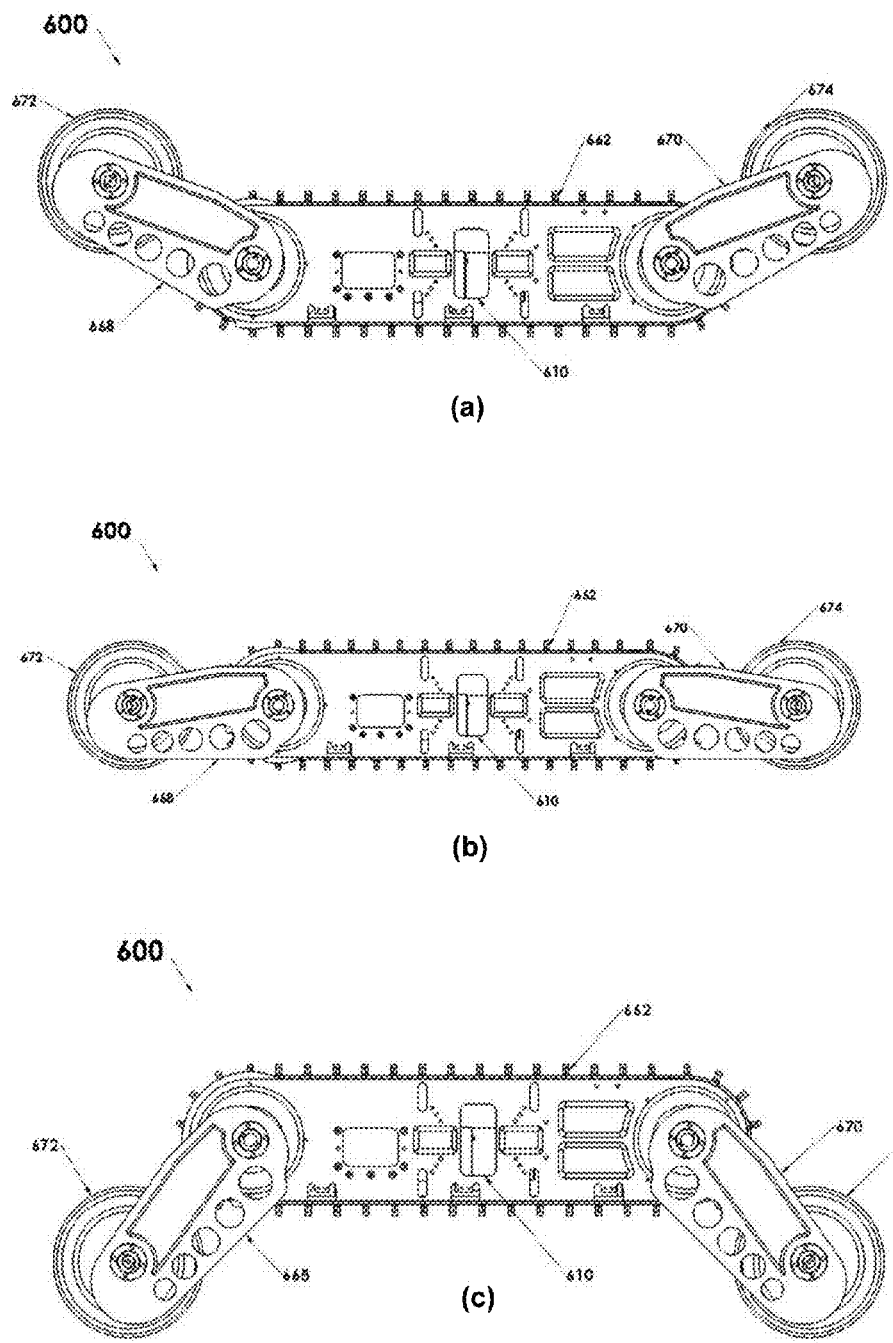
FIG. 26 is a side view of the dual mode mobile robot of FIGS. 23 and 24 and showing a) track mode; b) dual track and wheel mode; and c) wheel mode.
Figure 27:
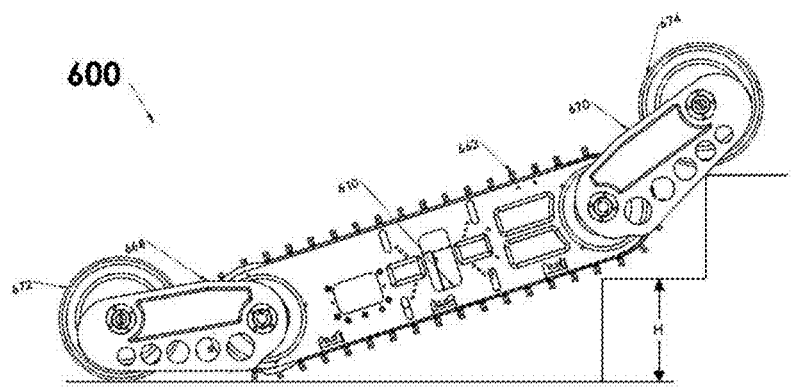
FIG. 27 is a side view of the dual mode mobile robot of FIGS. 23-24 in the dual track and wheel mode configured for climbing stairs.
Figure 28:
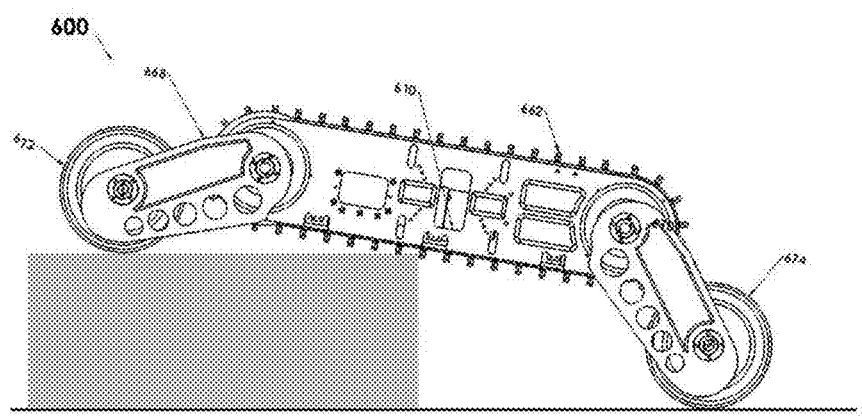
FIG. 28 is a side view of the dual mode mobile robot of FIGS. 23-24 in the dual track and wheel mode showing how it can aid in supporting the robot.
Figure 29:
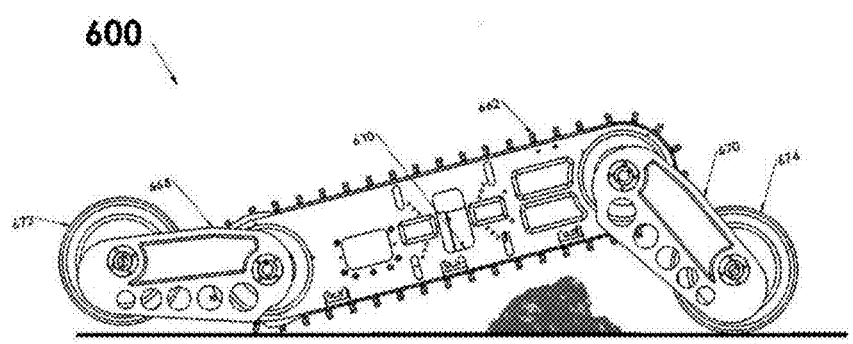
FIG. 29 is a side view of the dual mode mobile robot of FIGS. 23-24 in the dual track and wheel mode showing how it can facilitate clearance of an obstacle.

The pair of front swing arm mechanisms 670 are operably attached to a front axle 678. Front axle is operably connected to a front swing arm motor 680. The front swing arm motor 680 moves the front swing arm to stowed position shown in FIG. 26 (*a*); to the wheel position shown in FIG. 26 (*c*) and to variable intermediate dual mode positions an example of which is shown in FIG. 26 (*b*). Similarly a rear swing arm motor 682 is operably attached to a rear axle 684. Rear axle 684 is operably attached to the pair of rear swing arm mechanisms 668. A variety of intermediate dual mode positions are useful for climbing stairs FIG. 27, supporting the robot FIG. 28 or avoiding obstacles FIG. 29. As will be appreciated by those skilled in the art a wide variety of configuration are achievable for the robot 600 shown herein.

Front and rear swing arm mechanisms 670 and 668 rotate synchronously to let the wheels touch the ground. The interchange between track mode FIG. 23 and wheel mode FIG. 24 by using front and rear swing arm mechanisms will be easier as compare to dual mode mobile robot 100. However, the steel is a four wheel drive system skid steering type as compared to the independent steering type achievable with dual mode mobile robot 100.

A comparison of dual mode mobile robot 100 and dual mode mobile robot 600 is in the table below.

|  | Dual Mode Mobile Robot 600 | Dual Mode Mobile Robot 100 |
|---|---|---|
| Wheel Layout | Parallel to track | Perpendicular to track |
| Wheel Drive | 4 Wheel Drive | 2 Wheel Drive (Rear) |
| Steering Function in Wheel Mode | Skid (360 degrees) | Independent (Car Like) |
| Steering Function in Track Mode | Skid (360 degrees) | Skid (360 degrees) |
| Interchangeable Function | Flipper | Rotate 90 degrees |
| Track Driving Motor | 2 | 2 (Dual drive system) Shared with rear wheel drive |
| Rear wheel Driving Motor | 2 (Rear wheel) | 2 (Dual drive system) Shared with track drive |
| Front Wheel Driving Motor | 2 (Front wheel) | None |
| Interchangeable Mechanism | None | 2 Linear Motors |
| Flipper Driving Motor | 2 (Front and Rear axles) | 2 (Front/Left and Right) |
| Total number of motors | 8 motors | 4 motors and 2 Linear Motors |

The functionality of the dual mode mobile robot 100 and the dual mode mobile robot 600 are similar as demonstrated in the table below.

|  | Dual Mode Mobile Robot 600 | Dual Mode Mobile Robot 100 |
|---|---|---|
| Interchangeable Mode | Yes | Yes |
| Stowed Mode | Yes | Yes |
| Stair Climbing Mode | Yes | Yes |
| Push Mode (Supporting the robot when it is off the large obstacle) | Yes | Yes |
| Push Mode (Supporting the robot when it is descending the stairs) | Yes | Yes |
| Push Mode (Increasing ground clearance to recovery from the stuck situation) | Yes | Yes |

Figure 30:
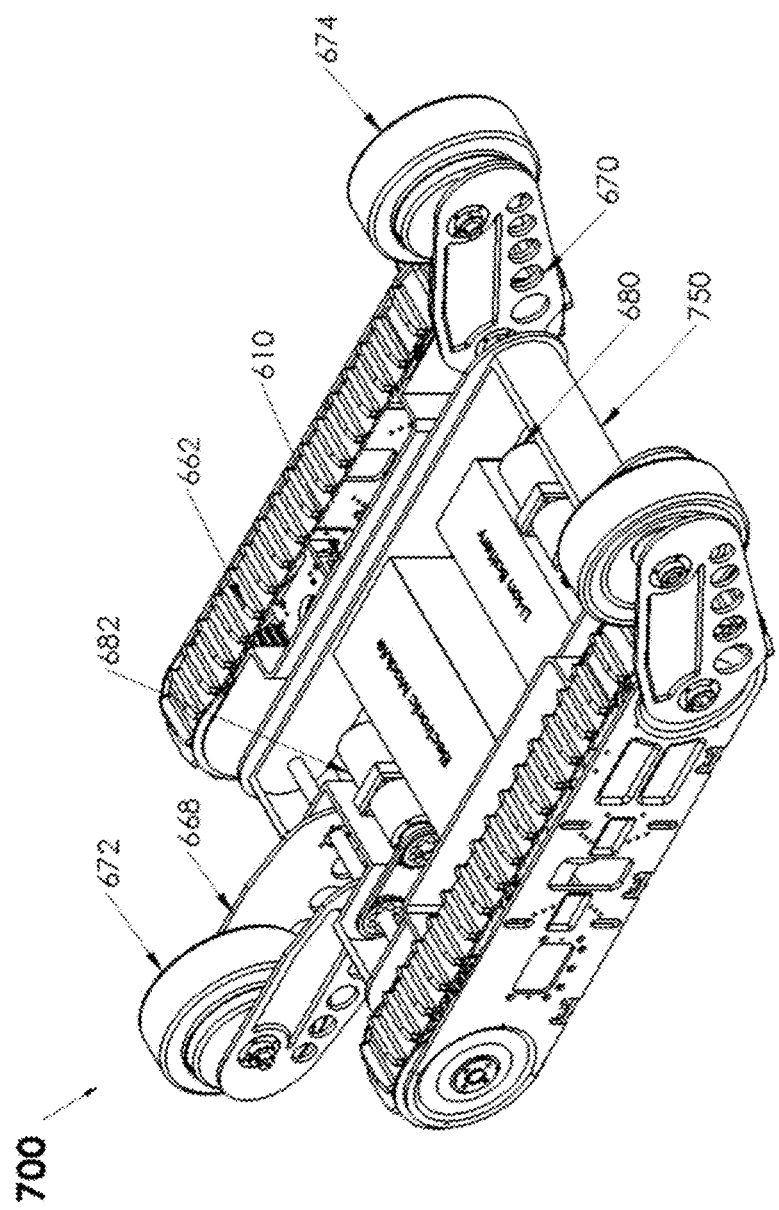
FIG. 30 is a perspective view of another alternate embodiment of a dual mode mobile robot having a parallel track and wheel configuration and showing the track mode, the embodiment being similar to that shown in FIGS. 23 to 29 but having a single rear wheel swing arm and rear wheel.

Another alternate embodiment of a dual mode mobile robot is shown generally at 700 in FIG. 30. Dual mode mobile robot 700 is similar to robot 600 described above but rather than a pair of rear swing arms 668 it includes a single central rear swing arm 768 with a single rear wheel 772.

Robot 700 includes a central platform 750, a pair of track-wheel driving modules 710 and a single rear swing arm 768. Each track-wheel driving module 710 includes a track assembly. The track assembly includes a track 762 which is driven by a rear drive pulley. The track 762 and rear drive pulley could be similar to that described above. The rear drive pulley is operably connected to drive motor. The track 762 is positioned around the drive pulley and an idler pulley.

The pair of front swing arm mechanisms 770 are operably attached to a front axle. Front axle is operably connected to a front swing arm motor 780. Front swing arm mechanisms 770 each include a front wheel 774. The front swing arm motor 780 moves the front swing arm 770 from a stowed position to a wheel position and to variable intermediate dual mode positions.

A rear swing arm motor 782 is operably attached to a rear axle and the rear swing arm mechanism 768. Thus rear axle is operably attached to the single rear swing arm mechanism 768. Rear wheel 772 may include a wheel hub motor alternatively front wheels 774 each include a wheel hub motor.

The different embodiments of the mobile robot herein each have a dual mode, namely a track mode and a wheel mode, and the modes can be selected by remote control. Alternatively the modes can be switched autonomously. For example the robot may include sensors that determine when the traction of the wheels is reduced below a predetermined threshold and then the robot automatically switches to a track mode. In addition the robot may include sensors that identifies when the robot encounters stairs and thus the robot automatically switches into stair climbing mode. The robot may also include sensors that can determine when the robot is on a smooth surface and thus the wheels would be more advantageous and it switches automatically into the wheel mode. It will be appreciated by those skilled in the art that there are a number of conditions that may be identified by sensors wherein either wheels or tracks are preferable and the robot can be configured to switch automatically into that mode when such conditions are identified.

Generally speaking, the systems described herein are directed to mobile robots. Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components. As used herein when two items are "operably connected" they need not be directly connected but may have other items connected therebetween.

As used herein, the phrase "by way of example" or variations thereof should not be construed as preferred or advantageous over other configurations disclosed herein.

Unless defined otherwise, all technical and scientific terms used herein are intended to have the same meaning as commonly understood to one of ordinary skill in the art.

What is claimed is:

1. A mobile robot comprising:
a platform;
a pair of track wheel driving modules attached to opposing sides of the platform, each of the track wheel driving modules having:
a track assembly;
a wheel assembly;
a pair of a swing arm mechanisms each operably pivotally attached to the platform, each swing arm mechanism having a swing arm, a front wheel operably attached to the swing arm and a front roller operably attached to a distal end of the swing arm and an arm drive motor operably connected to each swing arm and the arm drive motor drives and controls the angle between the platform and the swing arm, and each swing arm having a wheel position and a track position; and
wherein each of the track wheel driving modules is moveable from a track position to a wheel position and wherein in the wheel position the pair of swing arm mechanisms are pivotally used for independent steering of the mobile robot and in the track position the swing arm acts like a flipper.

2. The mobile robot as claimed in claim 1 wherein the track assembly includes a track positioned around a drive pulley and an idler pulley and a track drive operably attached to the drive pulley.

3. The mobile robot as claimed in claim 2 wherein each of the track wheel driving modules includes one of the pair of swing arm mechanisms and wherein the wheel assembly has a rear wheel operably attached at one end of the track assembly and the swing arm is attached to the track assembly and spaced from the rear wheel.

4. The mobile robot as claimed in claim 3 wherein the rear wheel is operably connected to a rear wheel drive.

5. The mobile robot as claimed in claim 4 wherein the rear wheel is a hubless rear wheel.

6. The mobile robot as claimed in claim 3 wherein the track drive is a dual drive system having a track drive mode and a wheel drive mode and the rear wheel is operably connected to the dual drive system.

7. The mobile robot as claimed in claim 6 wherein the dual drive system has one motor that is selectively connectable to a track drive shaft and a wheel drive shaft.

8. The mobile robot as claimed in claim 6 wherein the rear wheel is a hubless rear wheel.

9. The mobile robot as claimed in claim 8 wherein each swing arm is attached to an opposed end of the track assembly.

10. The mobile robot as claimed in claim 3 wherein each swing arm is attached to an opposed end of the track assembly.

11. The mobile robot as claimed in claim 2 wherein the track assembly further includes a tensioning mechanism operably connected to the track.

12. The mobile robot as claimed in claim 1 wherein each of the track wheel driving modules are hingeably attached to the platform and rotates from the track position to the wheel position.

13. The mobile robot as claimed in claim 1 further including an adaptable interface.

14. The mobile robot as claimed in claim 1 wherein each of the track wheel driving modules moves from the track position to the wheel position responsive to a remote control command.

15. The mobile robot as claimed in claim 1 wherein each track of the wheel driving modules moves from the track position to the wheel position autonomously.

16. A mobile robot comprising:
a platform;
a pair of track wheel driving modules attached to opposing sides of the platform, each of the track wheel driving modules having:
  a track assembly including a track positioned around a drive pulley and an idler pulley and a track drive operably attached to the drive pulley;
  a wheel assembly including a hubless rear wheel operably attached at one end of the track assembly and a swing arm operably pivotally attached at an opposed end to the track assembly and spaced from the rear wheel, the swing arm having a front wheel operably attached thereto;
  an arm drive motor operably connected to each swing arm and the arm drive motor drives and controls the angle between the track assembly and the swing arm;
  wherein the track drive is a dual drive system having a track drive mode and a wheel drive mode and the rear wheel is operably connected to the dual drive system;
wherein each track wheel driving module is hingeably attached to the platform and rotates from a track position to a wheel position.

17. The mobile robot as claimed in claim 16 further including a rotation mechanism operably attached to each of the track wheel driving modules.

18. The mobile robot as claimed in claim 17 further including an adaptable interface.

19. A mobile robot comprising:
a platform;
a pair of track wheel driving modules attached to opposing sides of the platform, each of the track wheel driving modules having:
  a track assembly having a track positioned around a drive pulley and an idler pulley and a track drive operably attached to the drive pulley; and
  a wheel assembly having a hubless rear wheel and a wheel drive operably attached to the hubless rear wheel with a drive chain and the hubless rear wheel is positioned such that the track is in the centre thereof and the hubless rear wheel rotates around the track; and
wherein each of the track wheel driving modules is moveable from a track position to a wheel position.

20. The mobile robot as claimed in claim 19 wherein the track drive and the wheel drive are a dual drive system having a track drive mode and a wheel drive mode.

\* \* \* \* \*